United States Patent Office 3,498,670
Patented Mar. 3, 1970

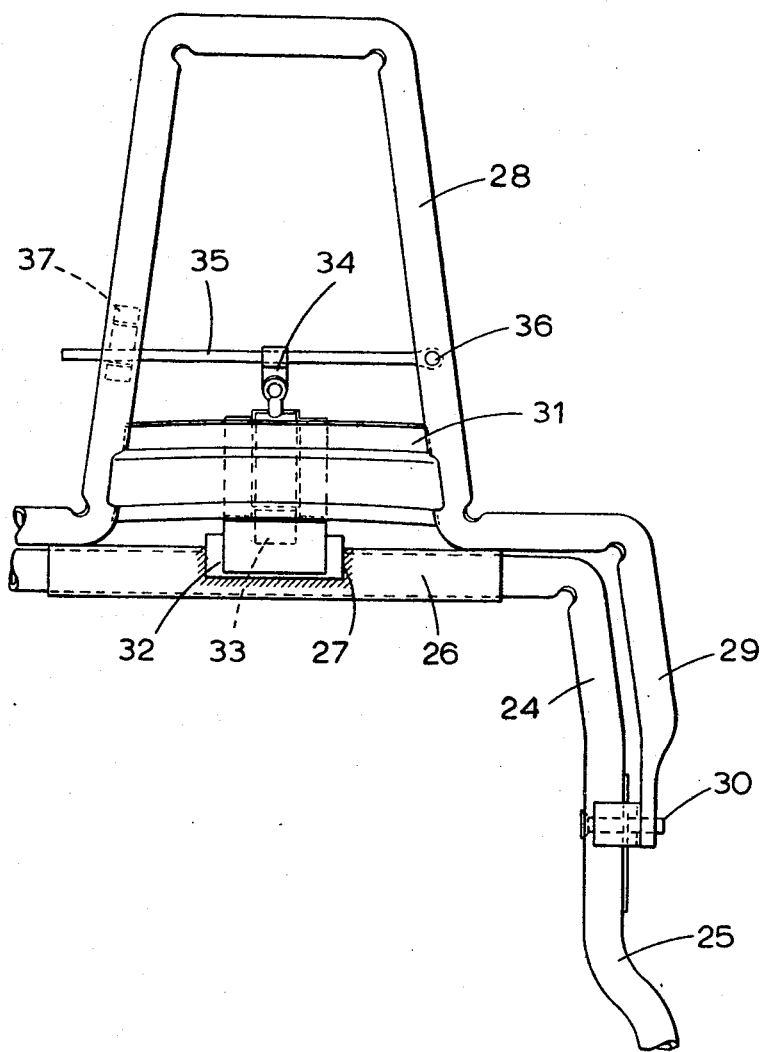

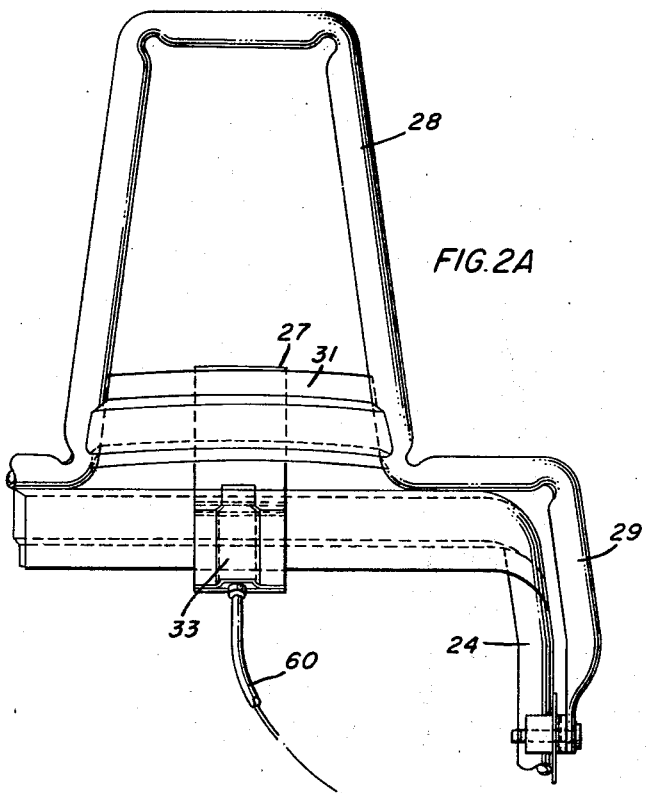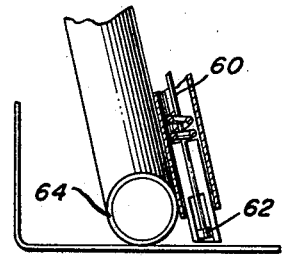
FIG. 2B
SECTION THROUGH PLUNGER
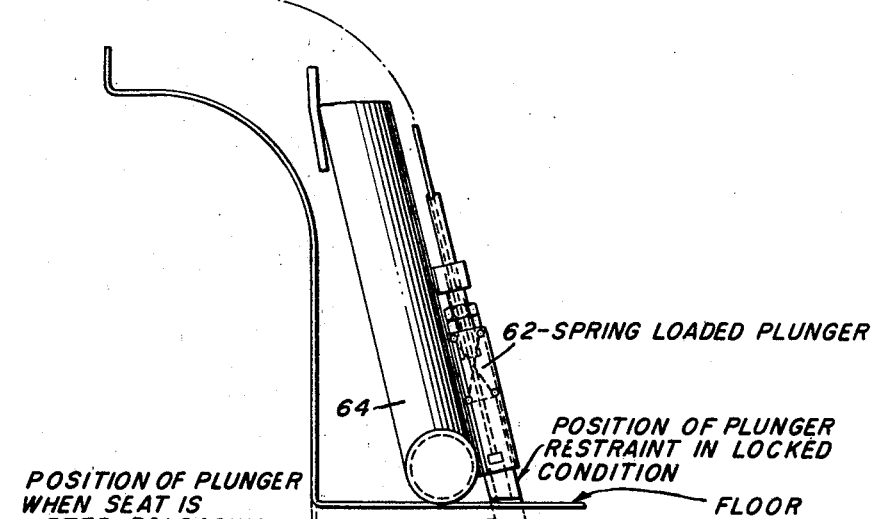
62-SPRING LOADED PLUNGER
POSITION OF PLUNGER RESTRAINT IN LOCKED CONDITION
FLOOR
POSITION OF PLUNGER WHEN SEAT IS LIFTED RELEASING RESTRAINT
INVENTORS
PETER M. FINCH
HENRY R. WALL

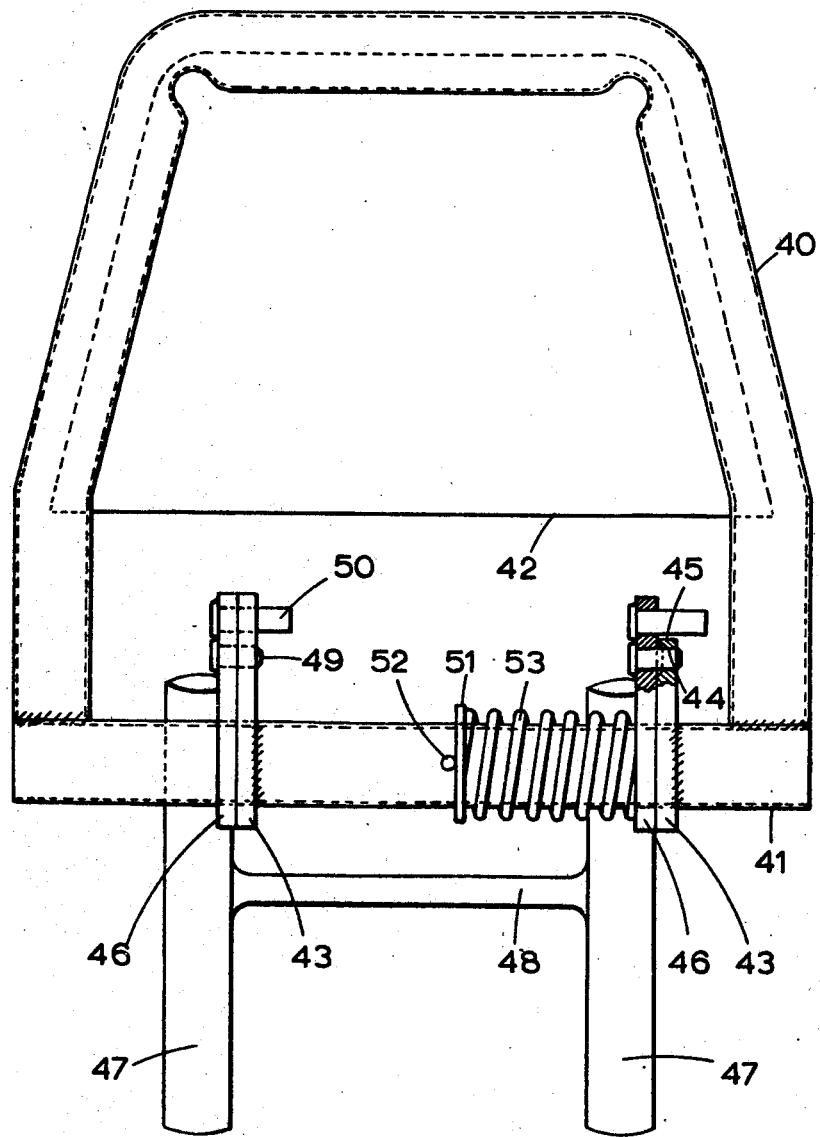

3,498,670
VEHICLE SEATS
Peter M. Finch, Oxford, and Henry R. Wall, Woodstock, Oxford, England, assignors to Pressed Steel Fisher Limited, Cowley, Oxford, England, a corporation of Great Britain
Filed May 2, 1968, Ser. No. 726,148
Claims priority, application Great Britain, May 3, 1967, 20,522/67
Int. Cl. A47c 7/38
U.S. Cl. 297—396       8 Claims

ABSTRACT OF THE DISCLOSURE

A vehicle seat mounted for forward tipping having a head restraint pivotally mounted on the back-rest for movement between an operative position and a folded position with releasable locking mechanism arranged to hold the head restraint in the operative position. Resilient means may urge the head restraint to the operative position. The head restraint may be yoke shaped with the limbs embracing the sides of the back-rest of the seat. The locking mechanism may be releasable by moving the head restraint sideways, by manual operation of a knob, or automatically when the seat is tipped forwards.

---

Figure 1:
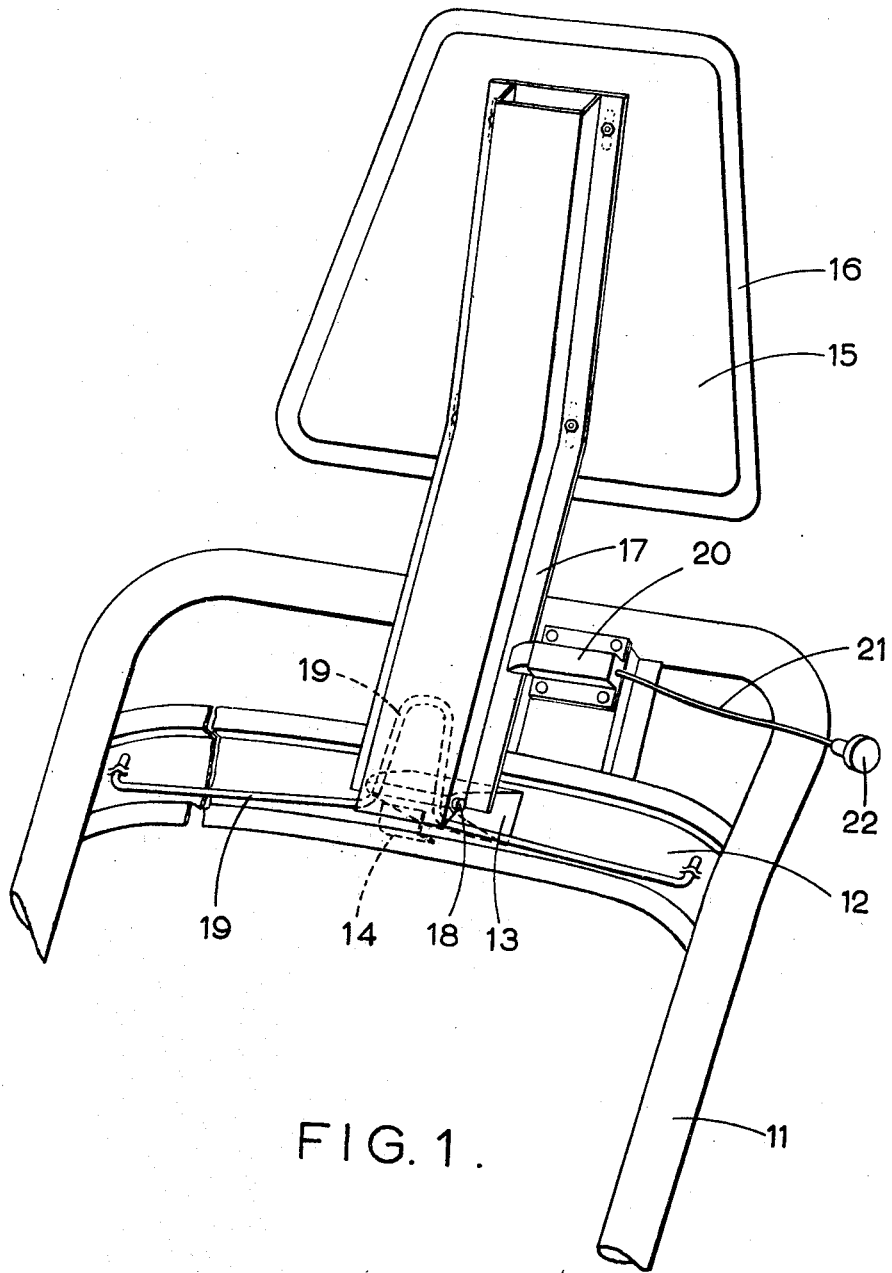

This invention relates to vehicle seats. It has been proposed that injury to the neck of a vehicle occupant, such as occurs when the vehicle is struck in the rear by another vehicle or occurs due to so called "whip lash," could be avoided by fitting the seat with a head-rest or other head restraint that prevents the occupant's head being jerked backwards sufficiently to cause injury.

However, in the case of two-door vehicles it is common for the driver's seat and the adjacent seat, to be hinged for forward tipping to allow access to the rear seats or to a storage space; and in some such cases it has been found that a head restraint interferes with the forward tipping of the seat.

An object of this invention is to provide an improved vehicle seat.

According to the invention a vehicle seat adapted to be mounted for forward tipping in a vehicle, includes a head restraint pivotally mounted on the back-seat of the seat for movement between an operative position and a downwardly and forwardly folded position, and releasable locking mechanism arranged to hold the head restraint in the operative position.

Preferably the head restraint is resiliently urged forwardly and downwardly so that when the locking mechanism is released the head restraint tends to assume the folded position.

The locking mechanism is conveniently arranged to allow the head restraint simply to be moved from the folded position to the operative position so that the restraint can be pushed back into the operative position where it is automatically locked.

The locking mechanism may be manually releasable or may include an operating device arranged to release the locking mechanism when the seat is tipped forward; thus in one example of the invention the locking mechanism incorporates a manually operable release knob or the like which is preferably recessed below the general level of the upholstery and trim and is located at the side edge of the seat or of the restraint, the head restraint release means may also release a further locking mechanism that normally prevents forward tipping of the seat itself; whilst in another example of the invention the locking mechanism is such that it may be released by a positive manual movement of the complete restraint, for example by pulling or pushing the restraint sideways; whilst in yet another example the mechanism may include a plunger which is resiliently urged to a position whereat the restraint is released but which is depressed when the seat is in a sitting position so that the head restraint is locked, or the mechanism may include a catch or other tripping device arranged to be actuated to release the head restraint when the seat is tipped.

It should be understood that the head restraint can be designed to form part of the upper portion of the back-rest of the seat. Thus in one form of the invention the head restraint is yoke-shaped with the limbs of the yoke extending down the sides of the seat back-rest when the restraint is in the operative position, and with the lower ends of the limbs each pivotally mounted on the back-rest; in such an arrangement the seat back-rest is preferably stepped inwardly near the top of the back-rest to provide, in effect, cut-away regions which accommodate the limbs of the back-rest and thus a common seat frame may be used both for seats which are fitted with the restraint and for other seats particularly where the arrangement is such that the locking mechanism is incorporated in the head restraint.

The invention will now be described by way of example with reference to the accompanying drawings in which:

FIGURE 1 is a fragmentary view of the upper portion of the frame of the back-rest of a vehicle seat which includes a head restraint structure shown in a non-upholstered state, FIGURE 2 is a fragmentary elevation of the upper portion of the frame of the back-rest of another vehicle seat which includes a yoke shaped head restraint shown in the non-upholstered state, and FIGURES 2A and 2B illustrate a modification.

FIGURE 3 is an elevation of a non-upholstered head restraint for fitting to yet another vehicle seat.

Referring firstly to FIGURE 1, the upper portion of the frame 11 comprises a tube bent to an invented U-shape to which a "top-hat" section cross-rail 12 is welded. A bracket 13 is welded within the channel of the cross-rail 12, and a lug 14 is welded to the lower side wall of the channel of the cross-rail 12.

A head restraint structure comprising a pad-supporting plate member 15 having edges 16 clinched over a reinforcing rod, and the plate 15 is bolted to a "top-hat" section member 17. The member 17 is pivotally mounted on the bracket 13 by means of a hinge pin 18.

A torsion bar 19 is arranged to urge the head restraint to a downwardly and forwardly folded position and a spring loaded locking mechanism 20 is arranged to hold the head restraint in an upright position (as shown in the drawing) with the member 17 abutting the frame 11. The locking mechanism is connected by an operating cable 21 to a knob 22.

It will, of course, be understood that the seat and head restraint are so trimmed with padding and an upholstery covering that only the knob 22 is uncovered, and even the knob 22 is preferably disposed in a recess formed in the padding.

In operation, when the knob 22 is pulled the locking mechanism 20 is released and the torsion bar 19 forces the head restraint to pivot about the hinge pin 18 and thus fold forwardly and downwardly until the member 17 abuts against the lug 14; and with the head-rest in this folded position the whole seat can be tipped forwardly. When the seat is returned to a sitting position, the head restraint can be manually pushed back into the upright position where it will be held by the engagement of the locking mechanism 20 with the member 17.

Referring to FIGURE 2, the upper portion of a vehicle seat back-rest frame comprises a tube 24 which is bent to an inverted U-shape with the upper portion of the frame inwardly stepped as at 25 and with a larger diameter tube 26 provided at the top of the frame and welded to the tube 24 in order to strengthen that region of the frame.

The portion 26 carries an upstanding locking plate 27 which is welded in position.

The head restraint is formed from a tube 28 which is bent to a yoke-shape with downwardly extending limbs 29 which are pivotally mounted at 30 on the seat frame 24.

A top-hat section cross rail 31 is welded to the tube 28 as shown, and carries a stop-plate 32 which is arranged to abut against the front of the locking plate 27 when the head restraint is in the operative position and a spring loaded latch mechanism 33 which is arranged to engage behind the locking plate 27 when the head restraint is in the operative position.

The latch mechanism 33 is connected by a strap 34 to a lever 35 which has one end pivotally mounted at 36 to the tube 28 with the other end restrained by a stirrup 37, and projecting beyond the tube 27.

In operation the projecting end of the lever 35 is lifted thereby disengaging the latch mechanism 33 from behind the latch plate 27 and allowing the head restraint to be hinged forward about the pivots 30. When the restraint is pushed back into the operative position the stop plate 32 abuts against the locking plate 27 to prevent further pivotal movement, and the spring loaded latch mechanism 33 engages behind the locking plate 27 to hold the restraint in the operative position.

In a modification of the above described arrangement shown in FIGS. 2A and 2B the locking plate 27 is mounted on the cross rail 31, and the latch mechanism 33 is mounted on the top of the tube 26. The latch mechanism is connected by a "Bowden" cable 60 to a spring loaded plunger 62 so mounted on a lower rear rail 64 of the seat frame that with the seat in the sitting position the plunger is depressed by the vehicle floor and thereby holds the latch in the locking position, whereas when the seat is tipped forwardly the spring loading the plunger moves the latch mechanism to disengage from the locking plate and thereby allows the head restraint to be pivoted forward about the pivots 30.

FIGURE 3 illustrates a non-upholstered head restraint for fitting to another vehicle seat. This head restraint comprises a tube 40 bent to an inverted U-shape and welded to a cross tube 41, and a backing plate 42 welded on the rear of the tube 40.

Two identical segmental plates 43 are welded to the cross tube 41 and each plate 43 has a countersunk hole 44 and an arcuate cut-away portion 45.

Two more identical segmental plates 46 are fitted on the cross tube 41 such that the cross tube 41 is journalled therein, and are welded to two rods 47 which are interconnected by the bar 48. Each of the plates 46 carries a short pin, such as 49, which is formed to engage in the corresponding countersunk hole 44, and a longer pin, such as 50, which is arranged to protrude into the corresponding arcuate cut-away portion 45 and which lies in a vertical plane substantially behind the small pin.

The cross-tube 41 carries a washer 51 which is fixed in position at one face by a split pin (not shown) passing through a hole 52 in the tube 41, and which bears against a coil spring 53. The coil spring 53 is in compression so that it tends to force each of the adjacent plates 43 and 46 together.

As will be understood, the rods 47 are fixed to the back-rest of a vehicle seat in any appropriate manner, and the head restraint and the back-rest are appropriately upholstered and trimmed.

In operation, with the head restraint in the operative position as shown in FIGURE 3, the pins 49 each engage in the corresponding holes 44, and pivoting of the head restraint is thereby prevented; moreover, backward pivoting of the head restraint is also prevented by the pins 50 which are abutting the plates 43 at the end of the arcuate cut-away 45 therein.

When the head restraint is to be folded forwards, the complete upper portion of the head restraint is moved sideways (to the right in FIGURE 3) against the force imposed by the spring 53. Such sideways movement separates the adjacent plates 43 and 46 and withdraws the pins 49 from the corresponding holes 44. When the pins 49 are fully retracted from the holes 44 the head restraint may be pivoted forwards by rotation of the cross tube 41 within the plates 46 until the other end of the arcuate cut-away in the plates 44 abuts against the pins 50.

When the head restraint is pushed back into the operative position, as soon as the pins 49 register with the corresponding holes 44 the spring 53 moves the head restraint sideways (to the left in FIG. 2) and thereby engages the pins 49 with the holes 44.

What is claimed is:
1. A vehicle seat comprising in combination:
  (a) a seat frame including a back-rest portion,
  (b) a head restraint,
  (c) said head restraint being pivotally mounted on said back-rest portion of the seat frame so that said head restraint may be pivoted to and between an operative position and a downwardly and forwardly folded position,
  (d) releasable locking means secured to said head restraint and said back-rest portion of the seat frame,
  (e) said releasable locking means including two coacting parts which, when said head restraint is in the operative position, mutually engage and thereby hold the head restraint in the operative position.

2. The vehicle seat of claim 1 including resilient means for normally urging the head restraint to a downwardly and forwardly folded position.

3. The vehicle seat of claim 1 wherein the seat frame is pivoted about its forward portion to thereby permit tipping it forward, and having an operator including a plunger mounted on the rear of the seat frame, said plunger coupled to said releasable locking means, movement of said plunger controlling operation of the locking means, tipping forward of the seat frame in turn controlling movement of the plunger.

4. The vehicle seat of claim 9 wherein said plunger is spring loaded to normally urge the locking means to unlock the head restraint and allow it to fold forwardly.

5. The vehicle seat of claim 1 wherein said head restraint is slidable transversely to one side, parallel to its pivot axis, and including a spring opposing such transverse movement, said releasable locking means being disengaged upon such transverse sliding.

6. The vehicle seat of claim 1, in which said head restraint is yoke shaped, and the limbs of the yoke embrace the sides of said back-rest portion of the seat frame.

7. The vehicle seat of claim 6 including an operator mounted on said head restraint for actuating said locking means.

8. The vehicle seat of claim 1 including an operator mounted on said seat frame for actuating said locking means.

References Cited
UNITED STATES PATENTS 2,760,559   8/1956   Austin  ---------- 297—408 X
3,186,763   6/1965   Ferrara  ---------- 297—396 X

FOREIGN PATENTS 1,445,621   5/1965   France.
  858,509   8/1949   Germany.

CASMIR A. NUNBERG, Primary Examiner

U.S. Cl. X.R.

297—403